United States Patent
Bullock

(10) Patent No.: US 6,923,609 B2
(45) Date of Patent: Aug. 2, 2005

(54) LAMINATED CARGO RESTRAINT SYSTEM AND METHOD

(76) Inventor: Matthew Bullock, 4509 N. 7th St., Arlington, VA (US) 22203

( * ) Notice: Subject to any disclaimer, the term of this patent is extended or adjusted under 35 U.S.C. 154(b) by 0 days.

(21) Appl. No.: 10/730,024

(22) Filed: Dec. 9, 2003

(65) Prior Publication Data

US 2005/0123368 A1  Jun. 9, 2005

(51) Int. Cl.[7] ................................................ B60P 7/08
(52) U.S. Cl. ......................... 410/97; 410/34; 410/100
(58) Field of Search ........................... 410/32, 34, 36, 410/42, 96, 97, 100, 155; 53/399, 441, 462, 53/556; 206/410, 597; 220/1.5; 248/499

(56) References Cited

U.S. PATENT DOCUMENTS

| | | | | |
|---|---|---|---|---|
| 4,054,226 A | * | 10/1977 | Bjelland et al. | 220/1.6 |
| 4,264,251 A | * | 4/1981 | Blatt | 410/100 |
| 4,640,853 A | * | 2/1987 | Schmeal et al. | 428/34.2 |
| 4,846,610 A | * | 7/1989 | Schoenleben | 410/96 |
| 5,431,284 A | * | 7/1995 | Wilson | 206/597 |
| 5,595,315 A | * | 1/1997 | Podd et al. | 220/1.5 |
| 6,089,802 A | * | 7/2000 | Bullock | 410/97 |
| 6,227,779 B1 | * | 5/2001 | Bullock | 410/98 |
| 6,368,036 B1 | * | 4/2002 | Vario | 410/98 |
| 6,607,337 B1 | * | 8/2003 | Bullock | 410/97 |
| 6,758,644 B1 | * | 7/2004 | Vick | 410/100 |

* cited by examiner

Primary Examiner—D. Glenn Dayoan
Assistant Examiner—Paul Chenevert
(74) Attorney, Agent, or Firm—Bradford E. Kile; Kile, Goekjian, Reed & McManus PLLC

(57) ABSTRACT

A laminated load restraint system and method for securing cargo within transport containers including first and second load restraining strips wherein each strip includes a substrate, a first layer of adhesive, a second layer of adhesive, a first layer of reinforcement strands and a second layer of reinforcement strands and a third layer of adhesive for attachment to a transport container interior surface.

21 Claims, 3 Drawing Sheets

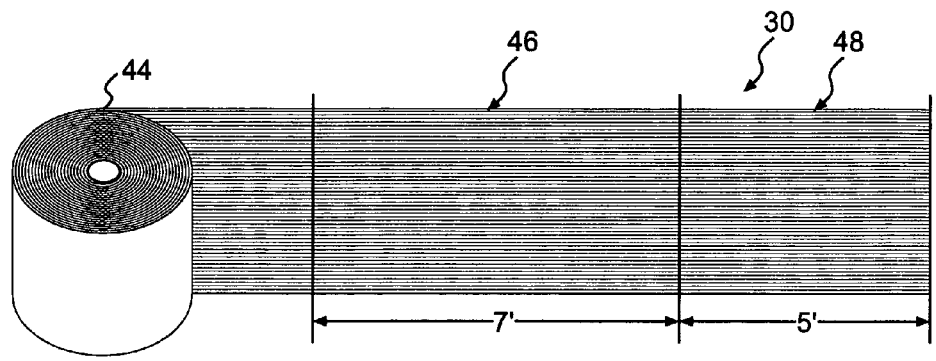
FIG. 3
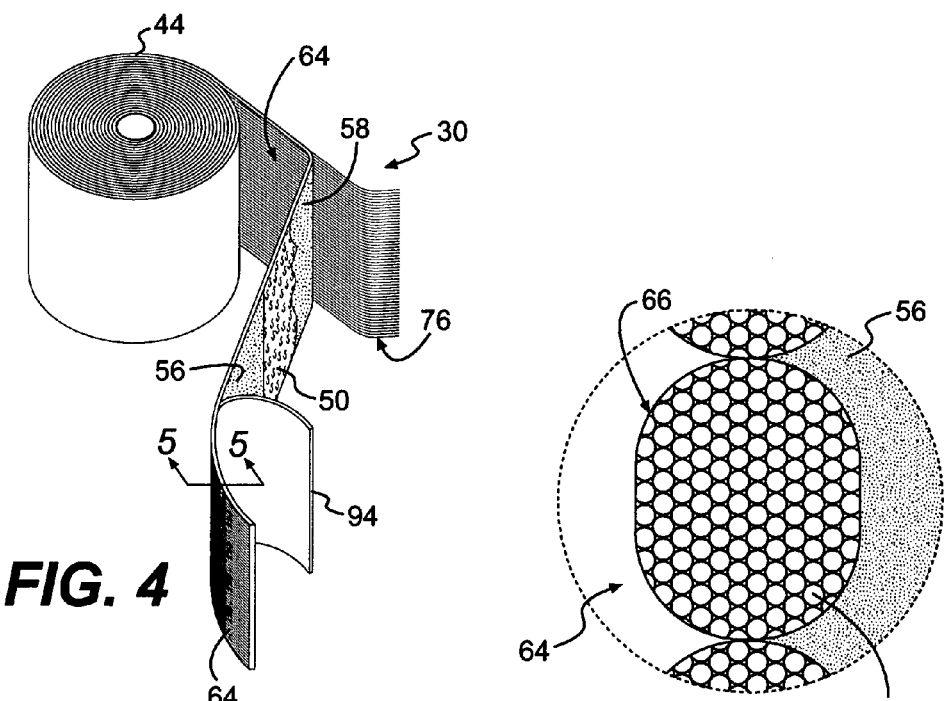
FIG. 4
FIG. 6

LAMINATED CARGO RESTRAINT SYSTEM AND METHOD

BACKGROUND OF THE INVENTION

This invention relates to an improved system and method for restraining cargo during transportation. More particularly, this invention relates to a novel system and method for securing and restraining undesired movement of drums, boxes, rigid and flexible containers, palletized or not palletized, within the interior of a truck body, a railroad car, an intermodal container, and the like. Moreover this invention relates to a system and method of enhanced securement strength and reduction of load shifting during transport.

In the United States most overland shipping is accomplished using either a tractor/trailer truck combination, often referred to descriptively as an eighteen wheeler, or via railroad boxcars and/or truck trailers mounted on flatcars. Truck trailers are typically forty five, forty eight or fifty three feet in length and are often loaded with cargo in containment enclosures such as 55 gallon closed head drums, super sacks or plastic reinforced bags, plastic wrapped bundles, cased goods, metal coils, specialty heavy paper rolls, plastic or metal containers mounted on pallets, and the like. Although each containment enclosure or bundle may be quite heavy and stationary at rest, the mass of a transport load can produce considerable momentum force as a truck or rail car is placed in motion.

Rail cars may be made up by a coupling or humping process within a switching yard. When a railroad car is rolled into a stationary string of cars, the impact causes the car couplings to lock together with a jolt. This impact can apply a significant force to cargo within the rail car. Moreover, during transport, railway cars are subject to braking forces, run-in and run-out coupler impact over grades, rail vibration, dips in the track, and swaying. In a similar manner trucks are subject to stopping and starting forces, emergency braking, bumps and swaying from uneven road beds, centrifugal forces on curves, vibration, etc. which tend to shift loads.

In addition to the above discussed overland shipping, most shipments for export, both in the United States and abroad, are placed into intermodal containers. These containers have standardized dimensions of twenty or forty feet in length and are fabricated with steel, corrugated sidewalls which are structurally self-supporting and rugged. Several intermodal containers may be stacked on top of each other for transport by sea, rail, or road. Within the containers, drums, boxes, etc. hold actual product as noted above.

The cargo of these intermodal containers experience various forces throughout the course of transport as noted above in connection with overland transport, such as, acceleration, centrifugal loads, braking, vibration, etc. as noted above. In addition, intermodal containers, when loaded onto ships for ocean transport, are subjected to wave forces including: yaw, pitch, heave, sway, and surge. Each of these forces has the potential to impart a substantial force on the contents within an intermodal container. In this, when a container changes direction or speed, cargo within the container tends to continue along the previously existing path until it contacts an interior wall of the container. Without some type of restraint and/or cushioning system, the cargo builds up considerable momentum, independent of the container. The amount of momentum is equal to the mass of a load multiplied by its velocity. In the case of large cargo loads, even a small change in velocity or direction can generate substantial forces.

When cargo contacts the interior walls or doors of a container, the force necessary to reduce its momentum to zero must be absorbed by the goods and/or the container. Such forces can result in damage to the cargo, damage to the interior walls or doors of the container, damage to the cargo packing, and may create dangerous leaks if the cargo is a hazardous material. Accordingly, it is undesirable to permit cargo to gain any momentum independent of a container during transport. This is accomplished by restraining the cargo within the container so that the cargo and the container are essentially united and operationally function as one object during transport.

In order to secure the load during transport and minimize undesired shifting and damage the load containment enclosures are often secured to the floor and/or sides of the trailer or boxcar by specially fabricated wood framing, floor blocking, rubber mats, steel strapping, heavy air bags, etc. Each of these previously known systems for securement have limitations associated with construction cost, lack of strength sufficient to secure dense loads, etc. Moreover, although rear doors of a trailer may be relied on to at least partially secure non-hazardous materials such as food-stuffs, tissue or soft paper products, furniture, appliances, etc., for hazardous materials, and many other types of loads, the rear doors of a container may not be used to even partially secure a load. In fact, in order to comply with Department of Transportation Regulations and Bureau of Explosives, hazardous materials are not even permitted to come in contact with rear doors during an impact.

Still further in some instances a trailer or boxcar may be used for shipping where only a partial load is carried. Moreover, a partial load might be positioned within a center location of a trailer. In this instance it may be impractical to construct wooden front and rear dunnage sufficient to secure a load where the front of the trailer is not utilized.

In the past, various dunnage materials have been utilized within trailers and/or intermodal containers to eliminate unwanted movement or shifting of a load during transport. The drums, boxes, or other containers have been restrained in several different ways. Primarily, cargo was stabilized by a method of load-locking and lumber bracing. This system involves strategically placing lumber between a load face and the rear doors of a container. This, however, can be a costly, time consuming, and generally inefficient means of securing a load. In this, the blocking process requires carpenters and is often outsourced to contractors. Moreover, wooden barriers can be time consuming to install. Further wood bracing can be somewhat brittle and subject to failure as a result of an abrupt impact.

In addition to the above, conventional methods of load-blocking with lumber bracing simply can not perform some tasks. For example, the most efficient means of filling an intermodal container is eighty, fifty-five gallon drums, double stacked in a twenty-foot long container. However, if eighty barrels are loaded there are only approximately four inches between the load face and rear doors of the container. Four inches is not enough space to put sufficient lumber to brace a load of eighty drums adequately. Consequently, when wood bracing is utilized as a system of restraint, shippers are forced to ship containers that are not filled to capacity. This reduces transport efficiency and increases transportation costs. Moreover, some types of wood, such as conifer woods which include evergreen, cone-bearing trees, such as pine, spruce, hemlock, or fir, are not acceptable to cross international boundaries without certification of special fumigation or heat treatment processing of conifer wood dunnage to prevent importation of pests. In this the International Plant Protection Convention ("IPPC") has issued "Guidelines for Regulating Wood Packaging Material in International Trade" having specific sections, requirements and limitations with respect to wood dunnage that has been accepted by numerous countries including the United States.

The Department of Transportation has established a standard to determine if a particular restraint system is capable of adequately securing hazardous cargo. In certain instances, conventional load-locking and lumber bracing has not received approval to ship hazardous cargo.

Other known means of restraint such as ropes, metal or plastic straps or stands and the like appearing in the past have tended to exhibit impaired performance and are often not functionally suitable to restrain loads under even moderate conditions. Consequently, a need exists for securing lading in truck trailers, boxcars, and intermodal containers that is functionally effective, cost-efficient, labor-efficient, and able to comply with Department of Transportation, Bureau of Explosives and/or the Association of American Railroads regulations. Still further a need exists for securement systems that have enhanced strength characteristics and limit lading travel within a container.

At least one method and apparatus for restraining cargo movement which overcomes some of the foregoing limitations is disclosed in U.S. Pat. No. 4,264,251, of common assignment with the subject application. The invention disclosed in that patent comprises sealing strips that are adhered to opposing sidewalls of a container, a strip of bracing material, and a joining mechanism are used to bind the ends of the strips together into a secure and taut restraint.

In the '251 patent, flexible securement strips are applied in a manner similar to hanging wallpaper, wherein an adhesive is applied onto a surface within a trailer where adhesion is desired. Then a retaining strip is applied to the adhesive. In addition to this requirement of a separate adhesive, systems appearing in the past sometimes encountered problems associated with weakness at the joints. At the juncture where the strips came together, an opportunity existed for slippage of the joined panels. Moreover, intermodal containers have corrugated walls as noted above. These corrugations make applying a restraining strip to a separate adhesive, which may not have an even application, substantially more difficult.

In addition to the restraining system disclosed in U.S. Pat. No. 4,264,251 other systems have been developed that provide enhanced operating characteristics and advantages, as discussed in the above identified U.S. Pat. Nos. 6,089,802; 6,227,779 and 6,607,337 all of common inventorship and assignment as the subject application. The disclosures of these prior four patents, of common assignment as the subject application, are hereby incorporated by reference as though set forth at length.

Further to these prior systems of securing lading in truck trailers, railroad cars, and intermodal containers increasing attention has been placed on securing heavier and denser loads, including hazardous materials, without abandoning the advantages achieved by previously known commercial systems. Moreover, there is interest in decreasing the elastic and/or plastic elongation permitted with prior securing systems so that hazardous materials can be transported with enhanced efficiency. In this regard it would be desirable to utilize eighty, fifty five gallon, drums within a conventional intermodal container. In this arrangement four steel drums need to be positioned next adjacent to the rear door of an intermodal container. In the past, issues have existed with respect to unacceptable travel of loads which may even come into contact with rear doors of the container during impact. As noted above, for hazardous loads, load contact with the rear doors is not acceptable by HazMat regulations.

In addition to the above, other restraining systems known in the past required multiple elements which were cumbersome to store, were arduous to install, and often required a degree of skilled labor. Systems using straps, nails, anchors, or bolts all require substantial storage space even when not in use. Furthermore, such systems increase the safety risk to the workers restraining the cargo. Still further such systems have often been unable to satisfy safety and travel limits imposed by regulatory bodies in various countries.

In addition to the above concerns, systems and procedures used in the past relying on accessories located within the cargo container often were not able to secure a partial load. That is, if the load does not extend to the front or rear of the container, such as a centrally located load, the necessary anchors may not be available in an area where they can be effectively used.

The problems suggested in the preceding are not intended to be exhaustive but rather are among many which may tend to reduce the effectiveness of cargo restraining systems known in the past. Other noteworthy problems may also exist; however, those presented above should be sufficient to demonstrate that cargo-restraining systems appearing in the past will admit to worthwhile improvement.

OBJECTS AND SUMMARY OF THE INVENTION

Objects

It is a general object that the subject invention provide a novel system and method to secure a load within a truck trailer, boxcar, intermodal container, or the like, which will obviate or minimize problems and concomitantly achieve at least some of the desired aspects of lading securement of the type previously described.

It is another general object of the subject invention to judiciously protect cargo from damage during transport.

It is a specific object of the invention to provide a securement system and method for a tractor trailer, boxcar, intermodal container, and the like, with enhanced strength to restrain a load in position during impact and/or other transport forces.

It is a related object of the invention to provide a securement system and method for a tractor trailer, boxcar, intermodal container, and the like, where the amount of load travel for a given level of impact is minimized.

It is another object of the subject invention to reduce the material and labor costs involved in securing lading within a trailer, boxcar, intermodal container, and the like.

It is yet another object of the subject invention to provide a system capable of restraining eighty, fifty-five gallon drums, double stacked, in a twenty foot intermodal container capable of receiving Department of Transportation and Bureau of Explosives approval.

It is a particular object of the subject invention to provide a method for securing cargo that is self-contained and may be installed quickly, reliably, and efficiently by relatively unskilled labor, even in intermodal containers having corrugated walls.

It is another object of the subject invention to provide for efficient and simple removal of the securing system from a trailer truck, boxcar, intermodal container, or the like, at a cargo destination.

It is still a further object of the subject invention to provide a system for restraining cargo that is able to withstand a wide range of temperatures and levels of humidity to enable effective use in a wide range of climates.

Brief Summary of the Invention

One preferred embodiment of the invention, which is intended to accomplish at least some of the foregoing objects, comprises a load restraining strip preferably having a flexible, substrate core, a first layer of adhesive and a second layer of adhesive bonded on opposite sides of the core. In a preferred embodiment of the invention the core is composed of spun bond polyester that is porous such that the first and second layers of adhesive mutually bond together. A first layer of generally parallel reinforcement strands are applied to an outside surface of said first layer of adhesive and a second layer of generally parallel reinforcement strands are similarly bonded to an outer surface of said second layer of adhesive. A third layer of adhesive extends in intermittent lengths of five feet, or so, along the outside surface of the second layer of reinforcement strands and operably serve to bond the load restraining strip to an interior surface of a cargo transport container such as a truck trailer side wall, a railroad boxcar interior wall surface, an intermodal container interior wall, or the like.

A polyethylene coated release paper layer is applied on the outside surface of the third layer of adhesive and the release paper is removed on site so that an installer can facilely apply the load restraining strip to an interior wall surface of a container.

In use, a length of a load restraining strip, typically twelve feet, is cut from a reel and the five foot length of release paper is peeled away. Next, the adhesive face is self-adhered to an interior sidewall surface of a transport container such as a tractor-trailer, boxcar, intermodal container, or the like.

An identical second strip is applied to the opposite side of the container in a mirror image posture and the free ends of the two load restraining strips are wrapped around goods to be secured within the container. The ends of opposing strips are overlapped at a center location around the load. A tensioning tool is then used to wind the two lapped ends together to draw the opposing load restraining strips taut around the load. A third, shorter piece of the strip material, is cut from a separate roll of patch material and its release paper is removed. This shorter patch strip is adhered to the exposed surfaces of the two load restraining strips at the joint. The shorter patch piece thus locks the strips in place and forms a secure load restraining system.

THE DRAWINGS

Other objects and advantages of the present invention will become apparent from the following detailed description of preferred embodiments taken in conjunction with the accompanying drawings wherein:

FIG. 3 is a pictorial view of the present invention showing a dispensing roll and a typical length of a securement restraining strip of enhanced strength and reduced elongation under impact loading in accordance with a preferred embodiment of the invention;

FIG. 4 is an axonometric view of a preferred embodiment of the securement strip as disclosed in FIG. 3 which has been partially broken away to disclose interior detail of the strip in accordance with the subject invention;

FIG. 6 is an enlarged detail view of a strand bundle of the area circled in FIG. 5 making up one component of a preferred embodiment of the invention.

DETAILED DESCRIPTION

Context of the Invention

Figure 1:
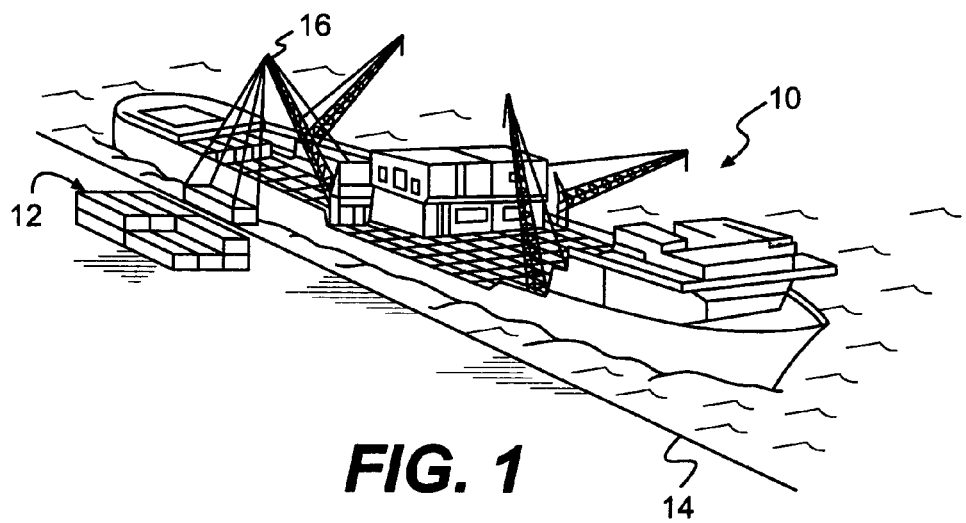
FIG. 1 is an aerial view of a ship at a dock with cranes lifting and loading intermodal containers onto the ocean going vessel.

Referring now particularly to FIG. 1, there is shown one operative context of the subject invention. In this, a ship 10 is shown docked at a port and intermodal containers 12 are being loaded onto the ship. Specifically, FIG. 1 depicts the ship 10 at a dock 14 and cranes 16 are lifting and loading the intermodal containers 12 to be stacked on the ocean going vessel 10. The subject invention may be advantageously used to secure cargo within the intermodal containers 12, like the ones being loaded onto the ship 10.

Figure 2:
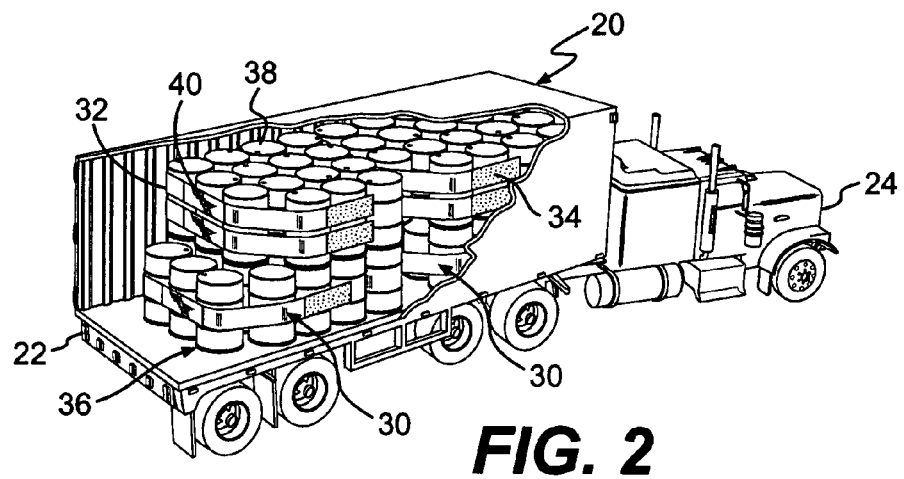
FIG. 2 is an axonometric view showing the interior of a truck trailer, or an intermodal container secured to a flatbed truck, with a partial load secured within the container.

FIG. 2 is an axonometric view that discloses the invention in another illustrative operating environment. In this view an intermodal or cargo container 20 is shown mounted upon a trailer 22 which is operably towed by a tractor 24 for land transport. Containers such as these are also operable to be mounted on railway flat cars either directly or attached to trailers 22. Other environments in which the subject invention is equally suitable for use includes railroad boxcars, and the like, not shown.

A partially cut away portion of FIG. 2 depicts a cargo restraining strip 30, in accordance with the invention, which is operable to be adhered to an interior wall surface 32 of the cargo container 20. The cargo securement system of the subject invention comprises a pair of opposing restraining strips 30 adhered to the side walls of the container 20 by the use of adhesive segments 34 that self adhere to opposing portions of the container side walls. The restraining strips 30 then extend to be wrapped around and embrace cargo 36, such as fifty five gallon drums 38. The restraining strips 30 overlap and are folded and drawn tightly together by a torque tool. Then an independent overlying patch segment 40 is applied to the junction to unite the opposing restraining strips 30 from the container side walls around the cargo to secure the cargo to the interior wall surfaces of the container 20.

Restraining Strip

Turning now to FIG. 3, the restraining strips 30 are manufactured and transported on reels or rolls 44. More particularly, a roll 44 of strips 30 are manufactured in an end-to-end continuous fashion in lengths of approximately twelve feet where approximately seven feet of the strip, note segment 46, is composed of a laminated composition in accordance with the subject invention, which will be discussed in detail below, and alternate five foot segments 48 include an extra self-adhering component. In one embodiment the strip 30 is transversely perforated, at approximately twelve foot lengths, so that the strip is operable for self tearing or in any event can be facially cut to create a single restraining strip 30 for use on a job site. Preferably, the restraining strip 30 is fifteen inches in width; however, other widths may be substituted depending on the need for additional strength, which a wider strip could provide.

Figure 5:
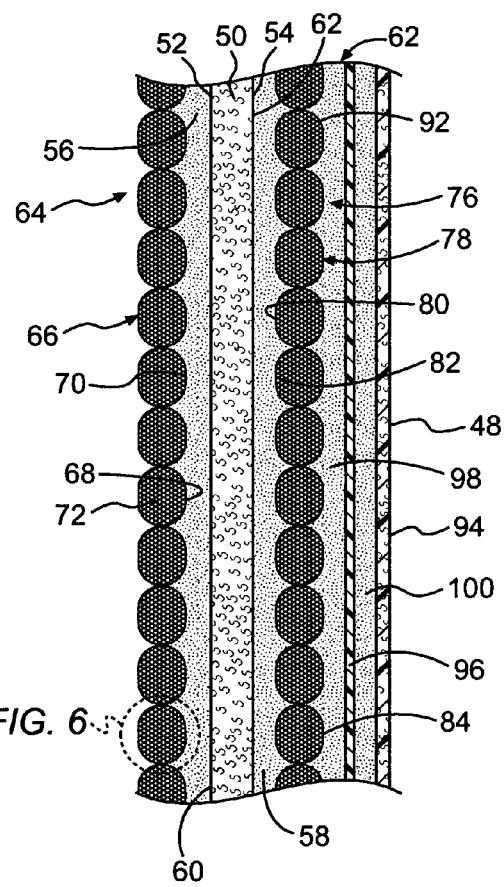
FIG. 5 depicts a partial, detailed, cross sectional view of a preferred embodiment of the securement strip taken along section lines 5—5 in FIG. 4.

FIGS. 4 and 5 disclose a preferred embodiment of the restraining strip 30. FIG. 4 shows an expanded, partially redacted, view to disclose the relative position and components of the restraining strip 30, in accordance with the subject invention. In this, the restraining strip 30 includes a substrate or core sheet 50 having a first surface 52 and a second surface 54. The substrate 50 is preferably a film of spun bonded olefin and is somewhat porous but stiff enough to serve as a suitable carrier for other components of the restraining strip invention. The substrate 50 may also be composed of an acrylic sheet having a plurality of transverse holes, a resin differential polymer with holes to render the substrate porous, or VALERON® which may be fashioned in the form of a screen foundation. Companies such as DuPont, Hoeschst Celanese, and others manufacture such materials. Alternatively, the substrate may not be porous provided that substantial shear strength is provided by adhesive materials to be discussed below.

The restraining strip 30 comprises a first adhesive layer 56 and a second adhesive layer 58 that is applied coextensively with the first surface 52 and the second surface 54, respectively, of the substrate 50. The first surface 60 of the first adhesive layer 56 overlays the first surface 52 of the substrate and the first surface 62 of the second adhesive layer 58 overlays the second surface 54 of the substrate 50. As noted above the substrate is preferable porous and the first and second adhesives 56 and 58 penetrate through the substrate and self bond together. The adhesive layers 56 and 58 are composed of compositions that have a high shear strength, wide operative temperature gradient—including cold weather tackiness and a specific gravity of less than one to displace moisture from the side walls of a container through capillary action. Adhesives of the type that are preferred are available from the Venture Tape Company of Rockland, Mass. In an alternative embodiment the substrate 50 may be composed of Mylar or some other relative non-porous material. In this embodiment the shear strength between the adhesive layers 56 and 58 are sufficient to transfer impact load forces to the reinforcing layers.

A first layer of reinforcement material 64 includes a plurality of parallel strands 66. The first layer of reinforcement material 64 has a first side 68 abutted against a second or outer side 70 of said first layer of adhesive 56. As shown more particularly in FIG. 6 each of the strands 66 is composed of a plurality of finer denier strands 72 of reinforcing materials. The reinforcement strands 72 may be composed of fine polyester fibers, polypropylene, polyethylene, polyolefin, glass fiber, aramids including Kevlar, carbon fibers, and the like. Kevlar is a polyamide in which all the amide groups are separated by para-phenylene groups. Kevlar is a registered trademark of the DuPont Company of Wilmington, Del. Individual bundles 66 are directly abutted against and adhered to the second or outer surface 70 of the first adhesive layer 56 as shown in FIGS. 5 and 6.

In a similar manner, a second layer of reinforcement material 76 includes a plurality of parallel strands 78. The second layer of reinforcement material 76 has a first side 80 abutted against a second or outer side 82 of said second layer of adhesive 58. As noted above, each of the strands 78 is composed of a plurality of finer denier strands of reinforcing materials. The reinforcing strands may be composed of a bundle fine denier fibers such as identified above. Individual bundles or strands 78 are directly abutted against and adhered to the second or outer surface 82 of the second adhesive layer 58 as shown in FIG. 5.

In addition to the main body of the load restraining strip 30, which is continuous throughout the strip and comprises a substrate 50, a first adhesive layer 56, a second adhesive layer 58, a first layer of reinforcement strands 64 and a second layer of reinforcement strands 76, as discussed above, the subject invention includes a length of an extra self-adhering segment 48, as noted above.

The self-adhering segments 48 comprise a third layer of adhesive 90 having a first side 92 in direct self-adhering contact with an outer or second surface 84 of the second layer of reinforcement strands 76. A release material or paper 94 extends over an outer most surface of the third layer of adhesive 90. The release paper 94 enables individual segments of the subject load restraining stripe to be manufactured on a reel core as shown in FIGS. 3 and 4 and the release paper 94 is peeled off of the load restraining strip 30 on site so that the third layer of adhesive 90 may be used by an installer to affix one end of the load restraining strip 30 to a side wall, or other attachment surface, of a transport container.

In a presently preferred embodiment, the third layer of adhesive 90, itself, is composed of a core or substrate member 96 and a first layer of adhesive 98 and a second layer of adhesive 100 overlaying opposite sides of the substrate 96. The substrate may be a Mylar material of a more porous material to enable the adhesive layers of the third adhesive layer to bond together.

Figure 7:
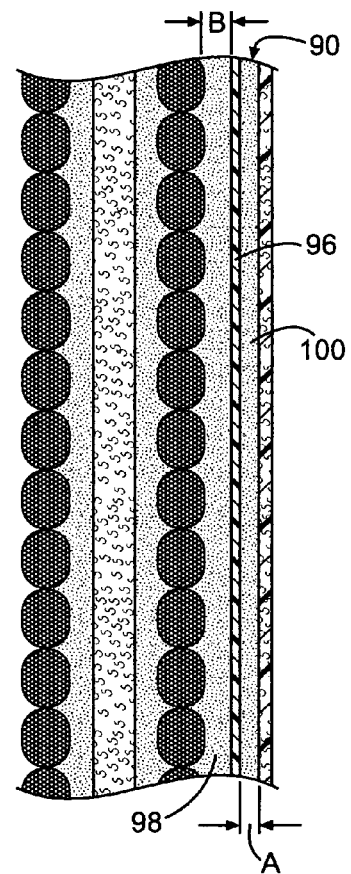
FIG. 7 is a view similar in nature to FIG. 5, however, disclosing an alternative preferred embodiment of the invention showing a differential adhesive thickness in accordance with the subject invention.

In the embodiment depicted in FIG. 5 the thickness of the first 98 and second layer 100 are substantially the same. Turning now to FIG. 7 an alternative preferred embodiment of the invention is shown where the third adhesive layer 90 is again shown as being composed of two layers of adhesive 98 and 100 coating either side of the substrate 96, such as Mylar. However, in this embodiment, the thickness of the outer layer of adhesive 100 has a thickness "A" that is less than the thickness "B" of the inner layer 98 of adhesive of the third adhesive layer 90. In this embodiment the outermost layer 100 of adhesive is designed to be placed against a securement sidewall, or other container surface, which is relatively smooth.

The subject invention is particularly designed to be used in either twenty or forty foot intermodal containers. These containers are ninety-two inches (seven feet, eight inches) wide, and ninety-two inches high. Although certain embodiments of the invention, such as depicted in FIG. 2 are adaptable to containers of all sizes, if a customer is exclusively using intermodal container having these dimensions, the adhesive from the glue line on the sidewall to the central overlapping portion would never be exposed during use. Thus, if the restraining strip is manufactured such that there is five feet of adhesive 48 and then seven feet without extra adhesive 46, and repeating, the cost of adhesive could be reduced. However, it will be recognized by those of skill in the art that other lengths may be manufactured to meet the use objectives of a given client without departing from the concepts of the subject invention.

Method of Restraining Cargo

As more particularly described in applicant's previously noted U.S. Pat. Nos. 6,089,802 and 6,227,779 an improved load restraining strip 30, such as described above is one component of a load restraining system as described more fully in these patents. Briefly, however, and as illustrated in connection with FIG. 2, a pair of load restraining strips 30 are cut from a roll 44. The release paper 94 is removed from strip segment 48 and the strip 30 is applied to one side wall surfaces of a container 20, as illustrated in FIG. 2. A second load restraining strip 30 is also applied to a directly opposing wall surface of the container. The free ends 46 of the opposing pair of load restraining strips 30 are wound together tightly with a torque tool, again, as specifically disclosed in the prior '802 and '779 patents. An overlaying patch segment 40 is then applied over the overlapped end segments 46 and the load is operably secured.

In the subject application, and in the claims, the term 'transport container" is used as a generic expression for all forms of transport units that are capable of caring cargo. A transport container unit includes but is not limited to intermodal containers, railway cars—such as box cars, truck trailers, and the like.

Having described in detail preferred embodiments of the invention, it may be useful to briefly set forth some of the major advantages of the invention.

SUMMARY OF MAJOR ADVANTAGES OF THE INVENTION

This subject invention provides a uniquely laminated restraining strip, wherein the shear strength of adhesive laminations is sufficient to significantly enhance the tensile strength of the overall load restraining strip 30 and protect cargo from damage during transport.

This invention also provides an entirely self-contained load restraint system with an outer adhesive component 90 carried on the strip.

This invention provides an adhesive backed strip for restraining freight and cargo that has a wide operative temperature gradient so that it can withstand cargo transport through most climates.

This invention enables a laminated load restraining strip to safely secure an entire load or even a partial load and moreover, to accomplish this without having to brace, nail, anchor, strap, or bolt, thereby substantially reducing labor costs and installation time.

This invention still further provides a product for restraining a load having enhanced sheer strength and minimum peel resistance so that, upon arrival at the destination, it may be quickly removed and disposed of without leaving a residue on a container interior wall surface.

This invention yet further provides for superior gripping and restraining due to the adhesion to corrugated, interior walls of an intermodal container.

This invention provides enhanced axial resistance to elongation so that it may be used in a system for transporting hazardous materials, and the like. Further the invention envisions use of differential thickness "A" and "B" of an attachment portion 48 of the load restraining strip 30.

A particular advantage of the subject invention is the capability to secure full or partial loads with enhanced axial strength and resistance to elongation with only one laminated product.

Another significant advantage of the subject invention is ability to customize the roll of polyester self-adhesive material to the needs of a particular customer.

Yet another significant advantage of the subject advantage is the strength of the barrier formed by the adhesive shear strength formed between the laminated layers of securement strips.

A further significant advantage of the subject invention is the ability to withstand the substantial force generated by restraining eighty fifty-rive gallon drums, double stacked, in a twenty foot long container.

In describing the invention, reference has been made to preferred embodiments. Those skilled in the art, however, and familiar with the disclosure of the subject invention, may recognize additions, deletions, substitutions, modifications and/or other changes which will fall within the purview of the invention as defined in the following claims.

What is claimed is:

1. A laminated load restraining strip for use in securing cargo within a transport container, which cargo is subject to shifting forces during transport, said load restraint strip comprising:
    a flexible substrate strip having a first side and a second side;
    a first layer of adhesive coextensively extending along and coating said first side of said substrate strip and having a first side of said first layer of adhesive in adhering contact with said first side of said substrate strip;
    a second layer of adhesive coextensively extending along and coating said second side of said substrate strip and having a first side of said second layer of adhesive in adhering contact with said second side of said substrate strip;
    a first layer of reinforcement strands bound to said substrate strip by said first layer of adhesive with a first side of said first layer of reinforcement strands adhered to a second side of said first layer of adhesive;
    a second layer of reinforcement strands bound to said substrate strip by said second layer of adhesive with a first side of said second layer of reinforcement strands adhered to a second side of said second layer of adhesive;
    a third layer of adhesive extending along and coating at least a portion of a second side of said second layer of reinforcement strands; and
    a release paper extending coextensively with and releasably adhered to said third layer of adhesive applied to said second side of said second layer of reinforcement strands, wherein said release paper may be removed from said third layer of adhesive on site and said load restraining strip releasably affixed to a side wall surface of a cargo transport container such that said load restraining strip may be used as a flexible securement element to secure cargo within a transport container.

2. A laminated load restraining strip for use in securing cargo within a transport container as defined in claim 1 wherein said substrate strip comprises:
    a pliant and porous material such that said first and second layer of adhesives at least partially interacts for adhering cooperation between said first and second layer of adhesive.

3. A laminated load restraining strip for use in securing cargo within a transport container as deemed in claim 1 wherein said substrate strip comprises:
    a pliant and non-porous material wherein said first and second layer of adhesives adhere to said substrate with sufficient shear force to operaly transfer restraining force between said first and second adhesive layers of said laminated load restraining strip.

4. A laminated load restraining strip for use in securing cargo within a transport container as defined in claim 1 wherein said substrate comprises:
    a spun bonded polyester substrate.

5. A laminated load restraining strip for use in securing cargo within a transport container as defined in claim 1 wherein said first and second layer of reinforcement comprises:

a plurality of reinforcement strands bound to said first and second layers of adhesive respectively in a parallel array.

6. A laminated load restraining strip for use in securing cargo within a transport container as defined in claim 5 wherein:
each of said strands of reinforcement comprises a plurality of finer denier fibers of reinforcing material.

7. A laminated load restraining strip for use in securing cargo within a transport container as defined in claim 6, wherein said finer denier fibers are composed of:
a polyester.

8. A laminated load restraining strip for use in securing cargo within a transport container as deemed in claim 6, wherein said finer denier fibers are composed of:
a polypropylene.

9. A laminated load restraining strip for use in securing cargo within a transport container as defined in claim 6, wherein said finer denier fibers are composed of:
a polyethtlene.

10. A laminated load restraining strip for use in securing cargo within a transport container as defined in claim 6, wherein said finer denier fibers are composed of:
a polyolefin.

11. A laminated load restraining strip for use in securing cargo within a transport container as defined in claim 6, wherein said finer denier fibers are composed of:
a glass fiber.

12. A laminated load restraining strip for use in securing cargo within a transport container as defined in claim 6, wherein said finer denier fibers are composed of:
an aramid.

13. A laminated load restraining strip for use in securing cargo within a transport container as defined in claim 6, wherein said finer denier fibers are composed of:
carbon fibers.

14. A laminated load restraining strip for use in securing cargo within a transport container as defined in claim 6, wherein said finer denier fibers are composed of:
kevlar fibers.

15. A laminated load restraining strip for use in securing cargo within a transport container as defined in claim 6, wherein said finer denier fibers are composed of:
a combination of at least two different fibers selected from the group consisting of a polyester, polypropylene, polyethylene, polyolefin, glass fiber, aramid, carbon fiber and kevlar.

16. A laminated load restraining strip for use in securing cargo within a transport container as defined in claim 1, wherein said third layer of adhesive comprises:
a substrate material;
a first course of adhesive covering a first side of said substrate material and adhered to said second side of said second layer of reinforcement strands; and
a second course of adhesive covering a second side of said substrate material and being operable for adhering contact with an interior surface of a cargo transport container.

17. A laminated load restraining strip for use in securing cargo within a transport container as defined in claim 16, wherein said substrate comprises:
a strip of mylar material.

18. A laminated load restraining strip for use in securing cargo within a transport container as defined in claim 16, wherein: said
said first course of adhesive of said third layer of adhesive is thicker than said second course of adhesive of said third layer of adhesive.

19. A method for securing cargo within a transport container, which cargo is subject to shifting forces, using a laminated load restraint system, said method comprising the steps of:
removing a first and a second laminated load restraining strip of material, having substantially equal lengths, from a reel of laminated strip material wherein each of said laminated strips includes a substrate layer, a first layer of adhesive coating a first side of said substrate strip, a second layer of adhesive coating a second side of said substrate strip, a first layer of reinforcement strands bound to said first layer of adhesive and a second layer of reinforcement strands bound to said second layer of adhesive and a third layer of adhesive bound to an outer surface of said second layer of reinforcing strands, said first and second laminated load restraining strips being operable for attachment at one end to an interior surface of a transport container and the other end to extend at least partially across an unconfined end of a load to be restrained;
peeling a release paper from said first and second laminated load restraining strips at one of the ends thereof;
applying said first and second laminated load restraining strips to opposing interior surfaces of the transport container so that said first and second laminated load restraining strips extend across the transport container enough to be overlapped;
pressing the adhesive of said first and second load restraining strips against the opposing interior surfaces of the transport container;
loading cargo into the transport container;
overlapping the ends of said first and second laminated load restraining strips that extend within the transport container;
drawing said first and second laminated load restraining strips taut around the rear of the cargo at the overlapped location; and
securing said first laminated load restraining strip to said second load restraining strip at the overlapped portion wherein the shear strength of said first and second adhesive layers operably transfer axial loads between said first and second reinforcing strips and to the interior surface of said transport container through said third adhesive layer, thereby forming a secure laminated load restraining system.

20. A method for securing cargo within a transport container, which cargo is subject to shifting forces, using a laminated load restraint system as deemed in claim 19, said method further comprising the steps of:
forming said third layer of adhesive with a substrate having a length less than the length of either of said first and second laminated adhesive strips, a first course of adhesive on said substrate adjacent to said second layer of reinforcement strands and a second course of adhesive on an outer surface of said substrate for attachment to an interior surface of said transport container.

21. A method for securing cargo within a transport container, which cargo is subject to shifting forces, using a laminated load restraint system as defined in claim 20, said method further comprising the step of:
forming the inner course of adhesive adjacent to said second layer of reinforcement strands with a thickness greater than the thickness of the adhesive course on the outer surface of the substrate.

* * * * *